United States Patent [19]

Kortschot

[11] Patent Number: 5,356,648
[45] Date of Patent: Oct. 18, 1994

[54] FROZEN DESSERTS WITH FLAVOR STRANDS

[75] Inventor: Cornelis Kortschot, Cambridge, Canada

[73] Assignee: Research Applications Inc., Cambridge, Canada

[21] Appl. No.: 964,895

[22] Filed: Oct. 22, 1992

[30] Foreign Application Priority Data

Oct. 23, 1991 [GB] United Kingdom ............... 9122482.4

[51] Int. Cl.$^5$ ............................................. A23G 9/14
[52] U.S. Cl. ................................... 426/249; 426/565
[58] Field of Search ............................ 426/565–567, 426/524, 249, 101

[56] References Cited

U.S. PATENT DOCUMENTS

| | | | |
|---|---|---|---|
| 2,246,871 | 6/1941 | Balch | 426/249 |
| 2,284,651 | 6/1942 | Gundlach | 426/249 |
| 2,293,538 | 8/1942 | Friedman | 426/249 |
| 2,334,052 | 11/1943 | Wedin | 426/249 |
| 2,576,842 | 11/1951 | Lehner | 426/565 |
| 2,646,757 | 7/1953 | Hackmann | 426/249 |
| 2,689,537 | 9/1954 | Peyton | 426/249 |
| 2,774,314 | 12/1956 | Moser | 426/249 |
| 3,886,973 | 6/1975 | Kinney | 425/131.1 |

*Primary Examiner*—Michael Ball
*Assistant Examiner*—Daniel J. Stemmer
*Attorney, Agent, or Firm*—R. Craig Armstrong

[57] ABSTRACT

A frozen dessert such as ice cream, and a process for manufacturing same, are described. The chocolate or other flavoring composition is injected into the stream of semi-frozen dessert in the form of a pumpable semi-liquid which freezes into ribbons or strands upon contact with the dessert. The fat and oil fractions of the flavoring composition are formulated so that the composition can be conditioned from a solid or semi-solid paste into a high-viscosity semi-liquid composition which can be pumped with a positive-delivery pump, and so that as soon as the composition is cooled a few degrees by being in direct contact with the ice cream, the viscosity rises rapidly and the composition once again becomes a solid or semi-solid. The conditioning can be accomplished in one of at least two ways. Firstly, the flavoring composition can be conditioned from the temperature at which is is a semi-solid paste, to a few degrees above that temperature. Secondly, the flavoring composition can be fully melted at an elevated temperature, and then supercooled to below the temperature at which it would be a semi-solid paste under steady-state conditions, agitating it to prevent crystallization. The preferred formulation for the flavoring composition is 46.61% fractionated and partially hydrogenated vegetable oils, 32.95% sucrose, 20.04% cocoa powder, and 0.40% lecithin. The vegetable oil composition is 91.8% Oleic, Stearic and Palmitic fractions, namely 10.8% Palmitic, 7.3% Stearic, and 74.7% Oleic.

9 Claims, No Drawings

FROZEN DESSERTS WITH FLAVOR STRANDS

BACKGROUND OF THE INVENTION

This invention relates to frozen dessert products such as ice cream, incorporating novel flavor strands or ribbons, of chocolate for example, and to the method of producing same.

In the production of an ice cream that is flavored with a solid chocolate or compound chocolate composition, it is currently the normal practice in the industry for a chocolate supplier to manufacture the chocolate or other flavoring material in his own plant. The finished pieces, in the shape in which they will be present in the ice cream, are then shipped to the ice cream plant and are there incorporated in the solid form into the ice cream. Chocolate chip ice cream is the best known variety of this type.

These pieces of chocolate or other flavoring material are usually formulated with hydrogenated fats with relatively high melting points so that they are solid at ambient temperatures and remain solid during shipping and storing. As a result, the pieces of chocolate become very hard when they are cooled in the ice cream to a freezer temperature of about minus 10° C. When a chocolate chip ice cream is consumed, the ice cream melts in the mouth and is swallowed and many of the hard chocolate pieces are left in the mouth and must be chewed and swallowed separately. Because high melting point fats are used, the mouth-feel of the cold chocolate or compound chocolate is waxy and hard and the release of the flavor is retarded.

Because the solid pieces are introduced into the ice cream by means of a screw feeder which conveys the pieces into the stream of ice cream, it is also not possible to introduce shapes that are fragile, such as rods, ribbons or strands. These more fragile shapes would be broken up in the screw feeder.

SUMMARY OF THE INVENTION

It is an object of the invention to provide a frozen dessert such as ice cream, and a method of manufacturing same, in which the chocolate or other flavoring composition is introduced into the dessert in the form of a pumpable semi-liquid which freezes into ribbons or strands upon contact with the dessert.

Thus in the present invention, the fat and oil fractions of the flavoring composition have been formulated so that the composition can be conditioned from a solid or semi-solid paste into a high-viscosity semi-liquid composition which can be pumped with a positive-delivery pump, and so that as soon as the composition is cooled a few degrees by being in direct contact with the ice cream, the viscosity rises rapidly and the composition once again becomes a solid or semi-solid.

This conditioning can be accomplished in one of at least two ways. Firstly, the flavoring composition can be conditioned from the temperature at which it is a semi-solid paste, such as about 26° C. for the preferred formulation described later herein, to a few degrees above that temperature, such as about 28° C. for the preferred formulation, where a specific fraction of the vegetable fat composition will melt, resulting in the high viscosity pumpable semi-liquid form.

Secondly, the flavoring composition can be fully melted, such as by placing it in a "hot room" at an elevated temperature, e.g. 40° C., and then supercooling it to below the temperature at which it would be a semi-solid paste under steady-state conditions, such as about 20° C. for the preferred formulation, but agitating it to prevent the crystallization which produces the semi-solid state. Using this method of conditioning requires careful control and timing, since the composition is unstable at this temperature, i.e. it wants to turn into a semi-solid paste; the supercooling must take place just prior to injection, whereas with the first conditioning method described above, the conditioning may be carried out well prior to the injection, if desired, since the composition is quite stable.

When the composition is conditioned according to either of the above methods, the semi-liquid composition can be pumped from a hopper to an injector having a number of nozzles which extend into the pipe through which ice cream is travelling on its way to the filling machine. The injector will thus extrude a number of strands or ribbons of the chocolate or other fat-based flavoring composition into the stream of ice cream.

It has been found that the chocolate composition should have a very viscous consistency at the moment that it is injected. If a liquid or molten composition that is pourable is injected into the ice cream, the strands or ribbons will not retain their identity. The reason for this is that the ice cream is already partially frozen and has a high viscosity (commonly known as soft ice cream) and if the chocolate is fluid and has a much lower viscosity than the ice cream, it will be pushed around in the turbulent flow of ice cream and the chocolate will redistribute itself into a variety of shapes and sizes, most of them in the form of small, irregularly shaped droplets. Under these conditions it is impossible to consistently obtain any kind of specific, predetermined pattern or shape such as a strand or a ribbon.

It has also been found that the composition of the chocolate fraction should be such that its viscosity will increase very rapidly when it is injected. This can be accomplished by a composition that has one particular fraction that is liquid at the time of injection but will crystallize quickly when the composition is cooled a few degrees.

It has been further determined that it is desirable to create a short interval after the chocolate composition is injected, during which time the ice cream travels in a largely linear flow pattern with a minimum of turbulence in order to allow the chocolate composition to solidify in the shape that is desired, such as a ribbon or continuous strands, without major distortions that would change the shape.

The turbulence is normally especially severe in the boundary layer between the ice cream and the wall of the pipe through which it is travelling and it is especially in this area that the injected composition will be broken up into small fragments.

This linear flow pattern can be achieved by warming a section of the wall of the pipe through which the ice cream travels on the downstream side of the injector to create a fluid boundary layer. This will minimize the friction between the ice cream and the wall of the pipe. It has been found that if a short section of the pipe is warmed by, for instance, a water jacket with ambient temperature water, such that an interval of three to six seconds is provided during which time there is little turbulent flow, the strands or ribbons are not distorted.

The chocolate composition is rapidly cooled during this interval by direct contact with the ice cream and its viscosity increases quickly when the oil fraction that was melted during the conditioning step re-crystallizes and becomes a solid.

It has further been found that it is possible to control the length of the strands and the amount of distortion in the strands by the length of time that elapses between injection and the first bend in the pipe that conveys the ice cream. If the first bend in the pipe is close enough to the injector, the flavoring composition is not completely solidified and the strands will bend. It is then feasible to fill the ice cream into containers and retain a number of continuous spirals.

If the distance between the injector and the first bend in the pipe is long enough to allow the flavoring composition to solidify completely, the strands will break in the turn and the flavoring composition will be present in the ice cream in the form of short, straight pieces.

The fat/oil formulation that can meet the requirements of this process must contain a specific fraction that is solid below a certain temperature above the temperature of the ice cream, such as about 26° C. for the preferred formulation, that melts during the conditioning step to a liquid and then re-solidifies quickly when it is cooled by the ice cream after injection.

DETAILED DESCRIPTION

The invention is substantially as described above. More specifically, however, to meet the above requirements it has been found that a partially hydrogenated vegetable oil that is fractionated and primarily consists of Oleic, Stearic and Palmitic fractions has the preferred composition. In the preferred formulation, 91.8% of the hydrogenated oil consists of these Oleic, Stearic and Palmitic fractions. This formulation, when mixed with sugar and cocoa powder, is a semi-solid paste at temperatures below 26° C. and can be liquified to a high viscosity semi-liquid by tempering it to a temperature of 28° C. according to the first conditioning method described above. Alternatively, the high viscosity semi-liquid can be formed by warming to about 40° C. and then agitating and supercooling to about 20° C., according to the second conditioning method described above. When the ice cream cools the chocolate quickly after injection, the chocolate becomes a solid again, with the viscosity increasing very sharply in a very short period of time.

The preferred formulation is shown below, as just one example of a number of possible formulations:

EXAMPLE

A fractionated and selectively hydrogenated blend of vegetable oils has the following predominant components:

| Carbon Designation | Composition | Fatty Acid |
|---|---|---|
| 16.0 | 10.8% | Palmitic |
| 18.0 | 7.3% | Stearic |
| 18.1 | 74.7% | Oleic |
|  | 91.8% |  |

This blend of partially hydrogenated oils is formulated into a chocolate flavoring with the following composition:

| Hydrogenated Vegetable Oil | 46.61% |
|---|---|
| Sucrose | 32.95% |
| Cocoa Powder | 20.04% |

| -continued | |
|---|---|
| Lecithin | 0.40% |
|  | 100.0% |

This formulation meets the requirements as stated above. It is a semi-solid at ambient temperatures. When it is warmed and conditioned to 28° C., in accordance with the first conditioning method, it is a high viscosity liquid that can be pumped with a so-called positive or gear pump. Alternatively, it can be conditioned according to the second method, as described above. After injection, when the composition is cooled a few degrees by the ice cream, the viscosity rises rapidly and the composition again becomes a semi-solid and retains its shape.

In the hardened ice cream, it is preferable that the chocolate composition has a brittle, snappy texture that produces an audible crackling sound when the scoop is drawn through the container. This is accomplished by using a fractionated oil composition that is low in those fractions, such as Linoleic, that have low melting points and the virtual absence of these oil fractions with low melting points creates a composition that is substantially 100% solid at minus 10° C., the temperature of the ice cream. This type of formulation provides an additional benefit in that it is very stable and resists oxidation and the development of rancidity.

At the other end of the spectrum, the chocolate composition also contains only small amounts of fat fractions with high melting points and because of this and the large Oleic fraction, the composition melts quickly and cleanly in the mouth to provide a quick release of chocolate flavor without the waxy mouth-feel that is normally associated with the use of real chocolate or compound chocolate substitutes in ice cream.

The process of the invention as described above is also very suitable for the production of frozen desserts where the anhydrous flavoring composition is aerated. Aeration modifies the structures and creates thinner walls and this makes it possible to produce larger pieces that still have good eating qualities because they fracture more easily. If aeration is accomplished by dissolving a gas, such as carbon dioxide, under pressure in the oil/fat fraction, this gas will create a foam just before or right after it leaves the extruder tubes. After the flavoring composition is extruded into the ice cream, it is cooled very quickly and this solidifies the foam so that it cannot collapse.

It will be appreciated that the invention is not limited to the specific example described above; any other compositions which meet the criteria described above could be used. Such other compositions will be obvious to those knowledgeable in the field.

It should also be appreciated that this invention is not limited to chocolate formulations. Provided that the same conditions are applied to the fat fraction of other flavorings, the same process will function. Examples of other flavorings that can be formulated are a brittle peanut flavor, butterscotch, caramel and fruit flavors.

It should also be clear that the temperatures mentioned above for the preferred formulation may vary depending on the formulation. The optimum temperatures may be readily determined by those knowledgeable in the field, through minimal and routine experimentation.

I claim:

1. A process for the manufacture of a frozen dessert comprising a frozen dessert base and substantially continuous ribbons or strands of a solid anhydrous flavoring composition contained therein, said process comprising the steps of:

providing said flavoring composition, comprising fat and oil fractions formulated such that said flavoring composition can be conditioned from a solid or semi-solid paste into a high-viscosity semi-liquid composition which can be pumped and such that the viscosity of the composition rises rapidly and the composition once again becomes a solid or semi-solid on being cooled a few degrees by contact with partially frozen dessert base;

so conditioning said flavoring composition into a high-viscosity semi-liquid composition; and pumping said flavoring composition to inject it as a substantially continuous ribbon or strand into a stream of partially frozen dessert base, whereupon the viscosity of said flavoring composition rises rapidly and it once again becomes a solid or semi-solid.

2. A process as recited in claim 1, in which said step of conditioning comprises adjusting the temperature of the flavoring composition from the temperature at which it is a semi-solid paste, to a few degrees above that temperature, such that a specific fraction of the fat therein will melt, resulting in the high viscosity pumpable semi-liquid form.

3. A process as recited in claim 2, where said flavoring composition comprises a blend of vegetable oils that are fractionated and selectively hydrogenated, an anhydrous solid sweetener, and at least one flavoring agent, said flavoring composition being a semi-solid paste at about 26° C., and where said conditioning step comprises flavoring composition is conditioned by adjusting its temperature to between about 26° to 30° Celsius.

4. A process as recited in claim 1, in which said step of conditioning comprises:

fully melting said flavoring composition at an elevated temperature; and a short time prior to said step of pumping and injection, supercooling it to below the temperature at which it would be a semi-solid paste under steady-state conditions, while agitating it to prevent solidification, thereby substantially increasing its viscosity by permitting partial crystallization.

5. A process as recited in claim 1, wherein said flavoring composition is allowed to solidify in the desired ribbon or strand shape by warming a short length of pipe carrying said frozen dessert in the region of said injection to reduce the viscosity of said frozen dessert immediately adjacent said pipe, thereby reducing friction between said frozen dessert and said pipe, thereby reducing turbulence in said region.

6. A process as recited in claim 2, wherein said flavoring composition is allowed to solidify in the desired ribbon or strand shape by warming a short length of pipe carrying said frozen dessert in the region of said injection to reduce the viscosity of said frozen dessert immediately adjacent said pipe, thereby reducing friction between said frozen dessert and said pipe, thereby reducing turbulence in said region.

7. A process as recited in claim 3, wherein said flavoring composition is allowed to solidify in the desired ribbon or strand shape by warming a short length of pipe carrying said frozen dessert in the region of said injection to reduce the viscosity of said frozen dessert immediately adjacent said pipe, thereby reducing friction between said frozen dessert and said pipe, thereby reducing turbulence in said region.

8. A process as recited in claim 4, wherein said flavoring composition is allowed to solidify in the desired ribbon or strand shape by warming a short length of pipe carrying said frozen dessert in the region of said injection to reduce the viscosity of said frozen dessert immediately adjacent said pipe, thereby reducing friction between said frozen dessert and said pipe, thereby reducing turbulence in said region.

9. A process as recited in claim 1, further comprising the step of aerating said flavoring composition before injection.

* * * * *